United States Patent [19]

Hager

[11] 4,352,133
[45] Sep. 28, 1982

[54] MAGNETIC DISC MEMORY

[75] Inventor: Horst Hager, Paderborn, Fed. Rep. of Germany

[73] Assignee: Nixdorf Computer AG, Paderborn, Fed. Rep. of Germany

[21] Appl. No.: 236,970

[22] Filed: Feb. 23, 1981

Related U.S. Application Data

[63] Continuation of Ser. No. 922,735, Jul. 7, 1978, abandoned.

[30] Foreign Application Priority Data

Jul. 18, 1977 [DE] Fed. Rep. of Germany ....... 2732432

[51] Int. Cl.$^3$ .................. G11B 21/08; G11B 5/60
[52] U.S. Cl. ................................. 360/106; 360/103
[58] Field of Search .............. 360/103, 104, 105, 98, 360/106

[56] References Cited

U.S. PATENT DOCUMENTS

| | | | |
|---|---|---|---|
| 3,523,285 | 8/1970 | Alger et al. | 360/103 |
| 3,772,666 | 11/1973 | Scholz et al. | 360/103 |
| 3,846,835 | 11/1974 | Morovitz et al. | 360/103 |
| 4,064,545 | 12/1977 | Goss | 360/98 |
| 4,107,748 | 8/1978 | Ho | 360/104 |
| 4,139,874 | 2/1974 | Shiraishi | 360/105 |

*Primary Examiner*—Robert S. Tupper
*Attorney, Agent, or Firm*—Krass, Young & Schivley

[57] ABSTRACT

A magnet disc data storage/retrieval system in which the pivot arms which carry the read and write heads are streamlined for low resistance to circumferential air flow caused by disc rotation. Hollow bodies having a wing profile are disclosed.

8 Claims, 6 Drawing Figures

MAGNETIC DISC MEMORY

This application is a continuation of application Ser. No. 922,735 filed July 7, 1978 now abandoned.

INTRODUCTION AND BACKGROUND OF THE INVENTION

This invention relates to a magnetic disc memory. Known magnetic disc memories comprise a plurality of circular magnetic storage discs which are arranged fixed against rotation and axially spaced from one another on a shaft directed at right angles to the disc plane, a drive mechanism to drive the shaft, a plurality of swivel arms to hold the magnetic heads serving to record and play back information onto the or from the magnetic storage discs, the swivel arms being mounted pivotably for a common swivel movement about a pivot directed substantially parallel to the shaft of the magnetic storage discs, so that a swivel arm can be pivoted at least partly into each gap between any two magnetic storage discs adjacent one another, and a drive mechanism to swing the swivel arms, the magnetic storage discs and the swivel arms together with the magnetic heads being enclosed in a housing.

The quality of such a magnetic disc memory is determined substantially by four criteria: by the reliability with which information can be stored and reproduced, by the mechanical dimensions, by the power input and by the access time, that is, the average period required to locate a certain storage place and to store or read information at this storage place. The reliability of storage or reproduction is determined by, among other things, the storage density, that is, the number of storage places per unit of area of the magnetic storage discs. For a given storage capacity it is not permissible, therefore, to fall short of certain minimum dimensions of the magnetic storage discs.

The access time is substantially determined by the speed at which the magnetic heads can be adjusted to a certain storage place of the magnetic storage discs. So that high setting speeds can be achieved, on the one hand, the moving parts (swivel arms, magnetic heads) must be made stable, so that they withstand the high acceleration forces and are not excited to the point of their natural mechanical resonance, and, on the other hand, correspondingly strong drive mechanisms are required, so that the swivel arms can be moved with the correspondingly high acceleration. Because of this, the volume and weight of known magnetic disc memories are relatively large, although a reduction in size of the magnetic storage discs, while retaining the same storage capacity, would be possible owing to improved coating of the magnetic storage discs and the higher storage density obtained thereby.

The problem of the invention is to design a magnetic disc memory of the above-mentioned type, so that its dimensions can be reduced and a lessening of the power input and a shortening of the access time are achieved at the same time.

BRIEF STATEMENT OF THE INVENTION

To solve this problem, it is proposed according to the invention that the swivel arms pivotable between any two adjacent magnetic storage discs have at least in the region penetrating between the magnetic storage discs a profile which has low air resistance in the direction of flow of air dragged around by the rotating discs in use.

The swivel arms which on known magnetic disc memories are made as angular discs consisting of solid material have for the air layer rotating in the gap between two magnetic discs a considerable air resistance which manifests itself in an elevated power input of the drive mechanisms for the swivel arms and the disc stack. By providing the swivel arms with a streamlined profile they put up only a small air resistance to the air layers rotating with the magnetic storage discs, so that the power input of the disc drive is reduced.

In a form of construction simple to manufacture the swivel arms are made in the form of a wing profile and have on the leading edge a substantially semicircular profile. It must be remembered when selecting the dimensions for the swivel arm that, on the one hand, the aerodynamic resistance is also determined by the ratio of thickness to length in the direction of flow of the body in the flow and, on the other hand, the dimensions must be selected so that the natural resonance of the swivel arms lies so high that natural vibration of the swivel arms is avoided during the sudden setting movements.

It is especially advantageous if the swivel arms are designed as hollow bodies. The resonant frequency of a hollow body of arbitrary wall thickness lies only immaterially below the resonant frequency of a similarly dimensioned solid body. The mass and, consequently, the moment of inertia of a hollow body lies, however, considerably below comparable values of a solid body. Thus, conventional swivel arms consisting of solid material have a moment of inertia higher by the factor 50 than that of the swivel arms according to the invention made as hollow bodies. Due to the considerably reduced moment of inertia of the swivel arms, while high mechanical resonant frequency and high stability thereof are maintained, the drive mechanism for positioning the swivel arms can be made correspondingly weaker despite an elevated positioning speed. That means a lower power input and smaller dimensions of the drive mechanism.

Such swivel arms made as hollow bodies and, for example, tubular can be welded, for example, in a simple way from thin sheet steel. According to an especially preferred form of construction which enables the moment of inertia to be further reduced substantially, while the same strength is maintained, the swivel arms are made of a compact fibre material. While having the same strength properties as steel, this compact fibre material has a specific gravity of only a quarter of the specific gravity of steel.

Reinforcements can optionally be arranged in the cavities of the swivel arms, in order further to increase the strength of the swivel arms without a substantial increase in the moment of inertia. Such a reinforcement can consist, for example, of a thin-walled honeycomb structure between the topside and bottomside of the swivel arm in question or of a hard foam packing filling at least partly the cavity of the swivel arm in question.

To allow streamlined fastening of the magnetic heads to the swivel arms, it is advantageous if the swivel arms are made wedge-shaped at their end remote from the pivot and terminate in a fin for fastening the magnetic heads. This form of the swivel arms can easily be realised, especially when the swivel arms are designed as hollow bodies, by squeezing the swivel arms in the end region remote from the pivot.

The magnetic heads can then be fastened to this fastening fin via spring tongues running substantially perpendicular to the longitudinal direction of the swivel arms, so that, when the swivel arms are pivoted, the said magnetic heads move along a track running approximately radially in relation to the storage disc axis.

Owing to the reduced moment of inertia of the swivel arms and their lowered air resistance when they penetrate into the gaps between the magnetic storage discs, it is possible to make weaker both the drive mechanism for the swivel arms and the drive mechanism for the magnetic storage discs. The resulting smaller dimensions of the drive mechanisms enable them to be integrated with the actual memory unit, so that, for example, the drive mechanisms are formed by electric motors engaging directly on the shaft of the magnetic storage discs or the pivot of the swivel arms. These electric motors can be formed, for example, by disc-rotor motors with an armature disc arranged fixed against rotation on the shaft or pivot. There is therefore no need for the otherwise conventional step-up gear arrangements between the drive motors and the driven shafts, together with the unavoidable frictional losses which occur. In the arrangement according to the invention this, also, leads to a lower drive power, so that the electric motors can be made correspondingly smaller. Due to the smaller dimensions and the lower weight of the parts of the magnetic disc memory it is possible to assemble the magnetic storage discs and the swivel arms, together with the drive mechanisms, which are enclosed in the housing into a structural unit which is self-contained and can be exchanged as a whole. This has, among other things, for example, the advantage that when the magnetic disc memory is serviced such a unit can be exchanged as a whole and replaced by another magnetic disc memory, so that the user is not prevented from using his data-processing system because of repair work on the magnetic disc memory. On this structural unit the inner space of the housing is completely sealed off and is connected to the outside via an absolute filter only for the equalisation of pressure between the inside and the outside. To trap the dust in the housing which still originates occasionally from manufacture or occurs during operation, an electrostatic/magnetic filter is provided in the housing.

A part of the cylindrical inside wall of the housing is charged electrostatically in the case of this filter or is coated with an electret and the carrier material is magnetised either directly or indirectly. The electrostatic lines of force departing from this filter attract electrostatically chargeable dust particles and the magnetic lines of force departing from the filter carrier attract magnetisable dust particles and retain them thereon. This filter can be made very space-saving, requires no power for operation and causes no noises. The filters used hitherto conventionally exclusively on disc memories are based on forced air circulation through a mechanical straight-through filter. The disadvantage of these filters resides in the fact that they constantly consume power owing to circulation of air and are altogether very bulky, since they not only consist of the actual straight-through filter, but the fan and an air duct from the fan to the filter also have to be accommodated.

So that the swivel arms can be secured during transport of the magnetic disc memory, they can be restrained in their extreme swivel position remote from the centre of the magnetic discs appropriately by operatively releasable locking means. When they are swung by the drive motor the swivel arms are therefore locked when they reach their outer extreme swivel position, for example, clamped by spring means, so that they are secured when the drive motor is switched off, but are released when swung by the drive motor in the direction of the centre of the magnetic discs.

Further features and advantages of the invention are to be found in the following description which explains an embodiment of the invention by reference to the attached drawings wherein:

DETAILED DESCRIPTION OF SPECIFIC EMBODIMENT

Figure 1:
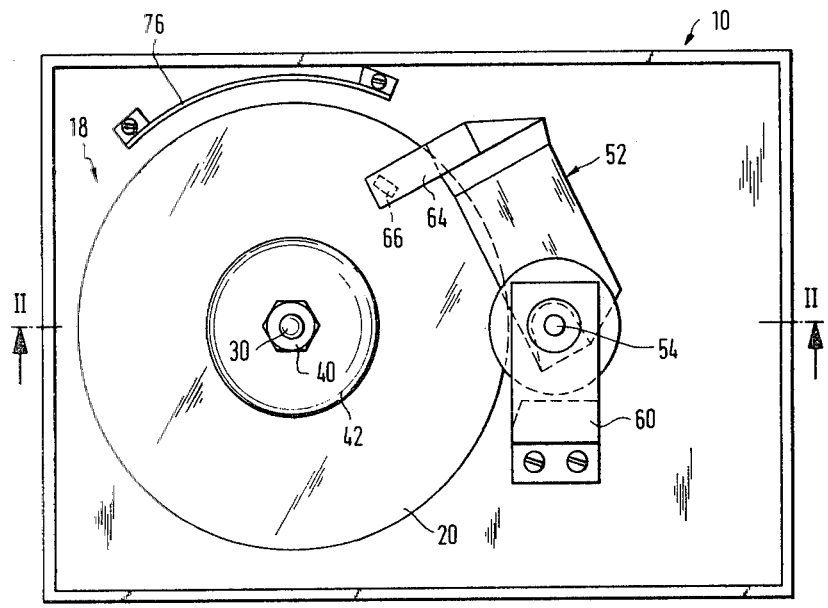
FIG. 1 is a partly schematic plan view of a magnetic disc memory according to the invention.
Figure 2:
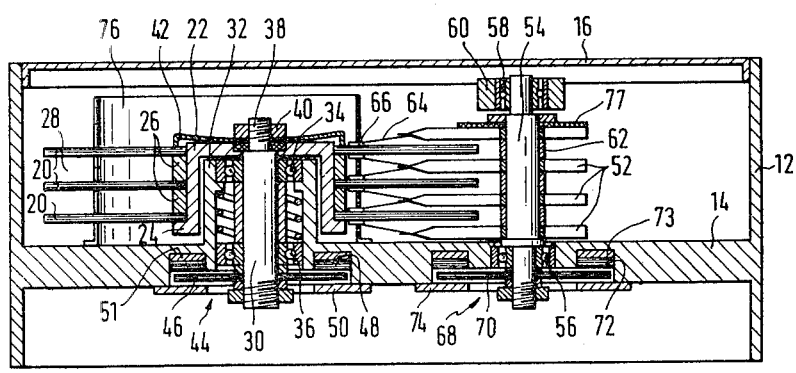
FIG. 2 is a partly schematic section along the line II—II of FIG. 1.

The magnetic disc memory shown in FIGS. 1 and 2 comprises a squared housing designated generally by 10, with side walls 12, a false bottom 14 and a cover 16. This space surrounded by the side walls 12, the false bottom 14 and the cover 16 is sealed in a dust-proof manner.

On the left-hand side of FIGS. 1 and 2 can be seen a stack of magnetic storage discs 20, designated generally by 18. The circular magnetic discs 20 are mounted on a cylindrical, pot-shape disc carrier 22 coaxially to the cylinder axis, the lowest magnetic storage disc of the disc stack resting on a flange 24 made on the pot edge of the disc carrier 22 and pointing radially outwards and the magnetic storage discs 20 stacked on top of one another being separated from one another by spacer rings 26 of equal axial length, so that a gap 28 is formed between any two magnetic storage discs 20.

The disc carrier 22 is mounted on a spindle 30, passing through its pot bottom, so that it engages over a tubular bearing box 32 which is arranged with its axis substantially perpendicular to the false bottom 14 and is made in one piece therewith. In the bearing box 32 the spindle 30 is mounted freely rotatably coaxially to the bearing box axis via bearings 34 and 36. The disc carrier 22 is placed onto the upper end, provided with an external thread 38, of the spindle 30 and is connected fixed against rotation to the spindle 30 by a nut 40 screwed onto the external thread 38, a cup spring 42 being pressed simultaneously by the nut 40 with its cup edge against the topmost magnetic storage disc 20 and consequently clamping the magnetic storage discs 20 on the disc carrier 22.

The disc stack is turned by a disc-rotor motor 44 with an armature disc 46 arranged fixed against rotation on the lower end of the spindle 30 and with magnets 48 inserted in the false bottom 14 and mounted on a divided circle. Thus, the spindle is therefore driven directly without the interposition of a gear or other torque-transmitting devices. The cut-out in the false bottom 14 which receives the disc-rotor motor 44 is closed towards the bottom substantially by a cover plate 50 which rests against the underside of the false bottom 14 and, in the same way as a plate 51 supporting the magnets 48, forms the magnetic return circuit.

On the right-hand side in FIGS. 1 and 2 can be seen a plurality of swivel arms 52 which are arranged on a second spindle 54 parallel to the first spindle 30 and are fixed against rotation therewith. The spindle 54 is mounted freely rotatably with its lower end in a shaft bearing 56 inserted in the false bottom 14 and with its upper end in a shaft bearing 58 which is, in turn, inserted in a retaining clip 60. The swivel arms 52 are separated from one another by equally long spacer rings 62, so that the swivel arms 52 have the same axial spacing from one another as do the magnetic storage discs 20. The swivel arms 52 are, however, offset axially in relation thereto, so that when the second spindle 54 rotates the swivel arms 52 can engage into the gaps 28 between the two magnetic storage discs adjacent one another, with the same spacing from each of the adjacent magnetic storage discs 20. The topmost and bottommost swivel arms pivot at a corresponding spacing respectively above the topmost and below the bottommost magnetic storage discs 20 of the disc stack.

In the ends of the swivel arms 52 remote from the pivot are fastened magnetic heads 66 via spring tongues 64 running substantially at right angles to the longitudinal direction of the swivel arms 52, as will be explained in more detail by reference to FIGS. 3 to 6. The magnetic heads 66 rest on the topside or bottomside of the magnetic storage discs 20 in question, as long as the magnetic storage discs 20 are at rest. However, the magnetic heads 66 are shaped so that when the magnetic storage discs 20 are rotated they are lifted from the disc surface by the rapid relative movement in relation to the air layer adhering to the magnetic storage discs and thus float in a balanced condition over the disc surface during normal operation. The drive to turn the spindle 54 and, consequently, to swing the swivel arms 52 is again formed by a disc-rotor motor 68 which consists substantially of an armature disc 70 mounted fixed against rotation on the lower end of the spindle 54 and of a magnet 72 arranged on a divided circle in the false bottom 14. The cut-out in the false bottom 14 which receives the disc-rotor motor 68 is closed at least partly towards the bottom by a cover plate 74 which rests against the underside of the false bottom 14 and, in the same way as a plate 73 supporting the magnets 72, forms the magnetic return circuit.

In the housing 10 there is also an electrostatic filter 76 which is made laminar and is curved coaxially to the first spindle 30 and which serves to trap the dust which remains after manufacture in the otherwise dust-proof housing 10 or which occurs during operation of the magnetic disc memory.

The coordinates of a storage place on the magnetic storage discs 20 are given by their radial spacing from the disc centre and by their angular position in relation to an angular zero. The magnetic storage discs 20 turn continuously at a constant high speed. To allow access to a certain storage place, the magnetic heads 66 must be adjusted to a certain radial track, which is effected by pivoting the swivel arms 52 about the axis of the spindle 54. Information is recorded on or read off from the storage discs sequentially in synchronism with disc revolution and in relation to the angular zero. The pivoting movement of the swivel arms 52 is controlled via a servo circuit which controls the motor 68. The servo circuit receives the position information required by scanning an incremental rotary pick-up 77. However, instead of the track information transmitted via the rotary pick-up 77, a single track information item recorded on a disc surface can be read with a magnetic head 66 and used for positioning control.

The disc stack is turned at a very high speed. When the disc stack is turned, the air layers lying between the magnetic storage discs 20 and adjoining the topside and bottomside of the disc stack are carried along, so that the swivel arms 52 swinging in between the magnetic storage discs 20 are exposed to an air flow of high speed. Especially in the case of the swivel arms 52 swinging into the gaps 28 the air resistance of these swivel arms is therefore of considerable importance. This air resistance is very high on conventional swivel arms, which necessitates correspondingly strong pivot drives and a strong drive of the magnetic storage discs. However, the swivel arms 52 according to the invention are designed so that they possess a profile which is streamlined, that is, has a low air resistance, as shown by FIGS. 3 to 6.

Figure 3:
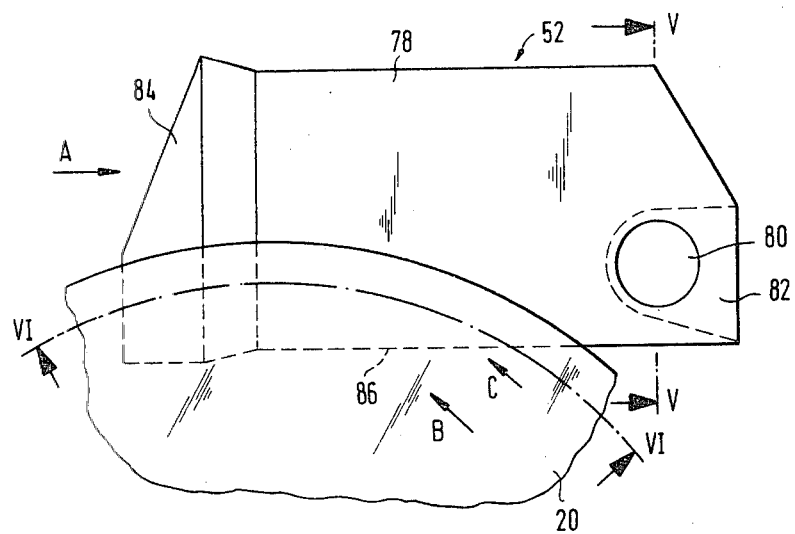
FIG. 3 is an enlarged plan view of a swivel arm during penetration between two magnetic storage discs shown only partly.
Figure 4:
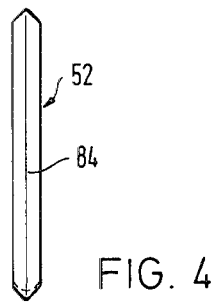
FIG. 4 is a view in the direction of the arrow A in FIG. 3.
Figure 5:
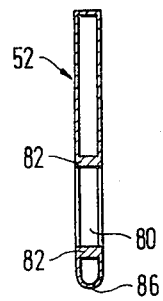
FIG. 5 is a section along the line V—V in FIG. 3.

FIGS. 3 and 5 show that the swivel arm 52 is designed in its main section 78 as a plate-shaped, thin-walled hollow body, the gap between the top and bottom sides being filled merely in the region of the bearing bore 80 by a supporting part 82, marked by a broken line, which forms a holder for the bearing bore 80 and simultaneously serves as a balancing mass for the swivel arm 52.

Figure 6:
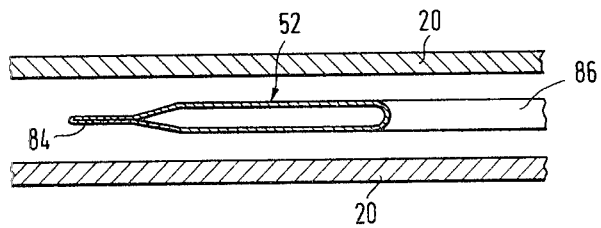
FIG. 6 is a section along the line VI—VI in FIG. 3 in the direction of flow.

At its end remote from the pivot the swivel arm 52 tapers in a wedge and terminates in a flat fin 84 lying in the plane of the swivel arm 52 (FIG. 6). This fin 84 serves to fasten the spring tongues 64 acting as carriers of the magnetic heads 66, a spring tongue 64 being fastened on the topside and bottomside of each of these fins 84. The wedge-shaped taper and the fin 84 can be made by squeezing the hollow swivel arm 52.

If the magnetic storage discs 20 are turned in the direction of the arrow B, the edge 86 of the swivel arm 52 near the centre of the magnetic storage discs 20 is attacked in the direction of the arrow C by the air layer carried along with the magnetic storage discs 20. This edge 86 is therefore provided with a semicircular profile (FIG. 5).

Since the flow of air to the swivel arms 52 follows the rotary movement of the discs 20, the sectional profile shown in FIG. 6 and following the sectional line VI—VI in FIG. 3 is obtained for the air resistance of the swivel arms 52. Air approaches via the edge face shown elliptically in the section, while air flows away via the wedge-shaped termination of the swivel arm, so that only a very small air resistance is obtained with low air turbulence.

As has already been explained, the design according to the invention of the swivel arms as hollow bodies permits a lighter construction of the swivel arms 52, that is, a lessening of their moment of inertia. With simultaneous optimal adaptation of the drive or servo motor 68 to the positioning system, as in the example of the use of a disc-rotor motor, the amount of inertia of the positioning system is reduced to approximately 1/50 of the hitherto conventional value. As a result, the drive power can be reduced to 1/50 of the hitherto conventional value with the same positioning speed or the positioning speed can be increased with the same drive power by the square root of the factor of the reduction in the amount of inertia. An intermediate value can, of course, also be selected.

Due to the lowering of the air resistance of the swivel arms 52 the drive power required for the disc stack 18 with the storage discs 20 is substantially reduced, since the air flow losses on the swivel arms 52, together with the bearing friction losses, can form a considerable proportion of the losses which the motor 44 has to overcome. The following data illustrates the substantial advance of the magnetic disc memory according to the invention in comparison with conventional magnetic disc memories of the same storage capacity:

If the total weight of a comparable magnetic disc memory was hitherto approximately 80 kg, the total weight can be reduced to approximately 10 kg in the case of a magnetic disc memory according to the invention. A volume of a magnetic disc memory of hitherto approximately 100 to 200 liters contrasts with a volume of approximately 15 liters in the case of the magnetic disc memory according to the invention and instead of a power input of approximately 0.5 kilowatts hitherto a power of only approximately 50 watts is now required. However, the most substantial advantage of the magnetic disc memory according to the invention resides in the fact its access time is lower by approximately the factor 3 to 4 than in the case of hitherto known magnetic disc memories of the same capacity. Furthermore, the magnetic disc memory according to the invention can be manufactured in a simpler and cheaper way.

It is to be understood that the invention has been described with reference to a specific illustrative embodiment and that the foregoing description is not to be construed in a limiting sense.

The embodiment of the invention in which an exclusive property or privilege is claimed is defined as follows:

1. A magnetic disc memory comprising a plurality of circular magnetic storage discs which are arranged axially spaced from one another on a shaft directed at right angles to the disc plane, a first drive means to drive the shaft, a plurality of swivel arms mounting a plurality of magnetic heads to record and play back information onto or from the magnetic storage discs, the heads including means for dynamic air-spacing from the discs responsive to high speed disc rotation, means pivotally mounting the swivel arms on a pivot for common swivel movement about an axis spaced from and substantially parallel to the shaft axis, so that a swivel arm can be swung in an arcuate path across the disc plane immediately adjacent thereto to position said magnetic heads between two adjacent magnetic storage discs to record and play back information on various tracks thereon, and a second drive means to swing the swivel arms, each of said swivel arms over the portion thereof which extends into the region adjacent the storage discs being constructed of spaced apart upper and lower planar walls of rigid material which extend parallel to one another and to the disc planes, said spaced apart walls being joined at the leading edge thereof by a semicircular wall portion and being joined at the trailing edge thereof by a wall portion to produce a hollow, lightweight body having a symmetrical aerodynamic surface thereby to minimize the weight and air resistance of said portion, the spacing between said upper and lower planar walls being reduced to substantially zero over the terminal end portions thereof remote from said pivot, and means securing the magnetic heads to the respective swivel arms at the terminal ends thereof opposite the pivot.

2. A magnetic disc memory according to claim 1, wherein the swivel arms have a reinforcement means within the hollow portion thereof to receive the pivot.

3. A magnetic disc memory according to claim 1, wherein the upper and lower walls of the swivel arms are abutting at their end remote from the pivot to form a flat fin which is parallel to the disc plane.

4. A magnetic disc memory according to claim 3, wherein the magnetic heads are each fastened to the terminal end portions with spring tongues running substantially perpendicular to the longitudinal direction of the swivel arm, so that when the swivel arms are pivoted the said magnetic heads move along a track running substantially radially in relation to the axis of the storage discs.

5. A magnetic disc memory according to claim 1, wherein the first and second drive means are formed by electric motors engaging directly respectively the shaft of the magnetic storage discs and the pivot of the swivel arms.

6. A magnetic disc memory according to claim 5, wherein the electric motors are formed by disc-rotor motors each with an armature disc arranged respectively on the shaft and the pivot.

7. A magnetic disc memory according to claim 1, wherein the magnetic storage discs and the swivel arms, together with the first and second drive means are enclosed in a housing and form a self-contained structural unit exchangeable as a whole.

8. A magnetic disc memory according to claim 7, wherein an electrostatic filter is arranged inside the housing.

* * * * *